United States Patent Office 3,434,948
Patented Mar. 25, 1969

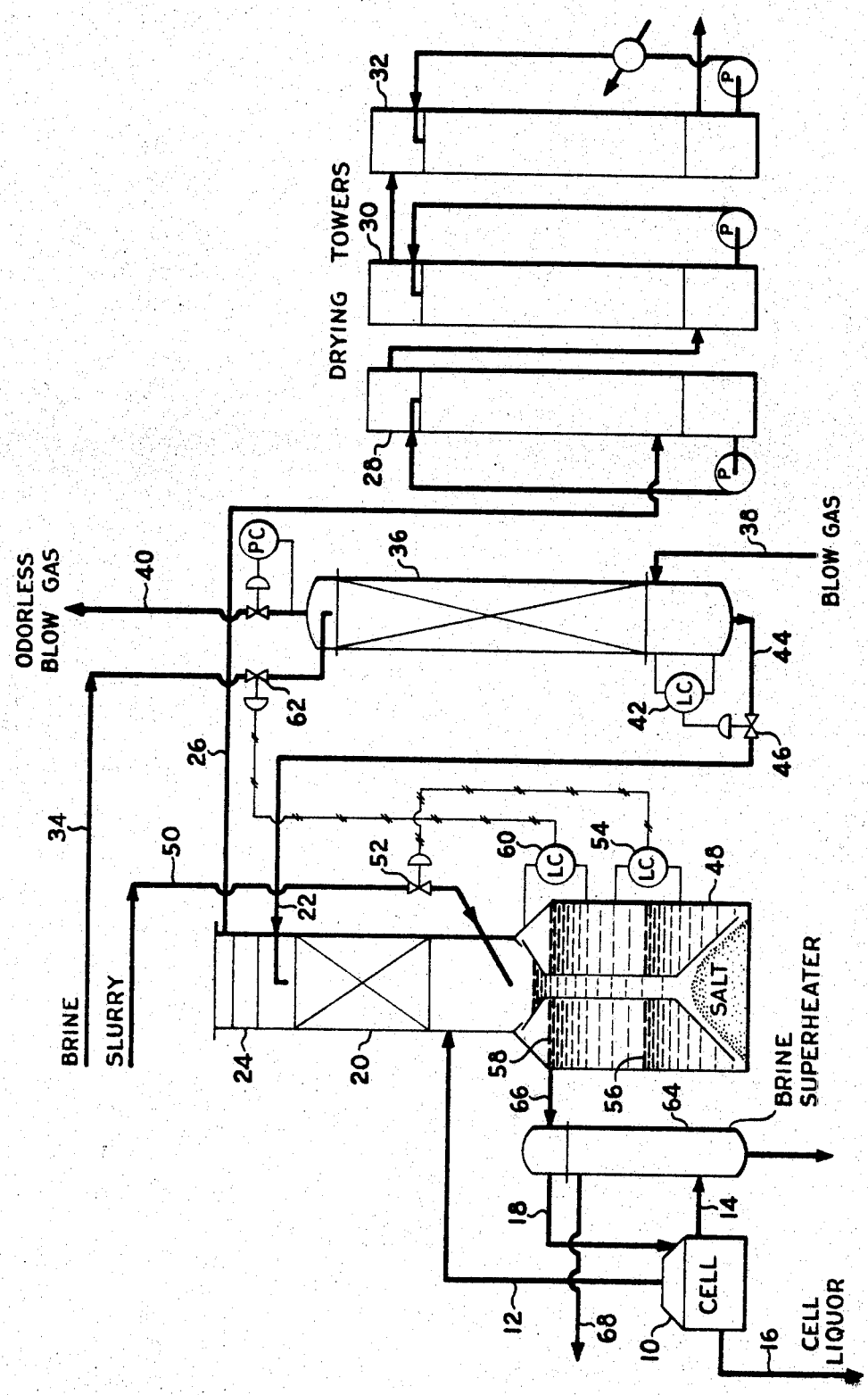

3,434,948
METHOD FOR CHLORINE COOLING AND BRINE HEATING
Thomas Hooker, Youngstown, and John E. Currey, Niagara Falls, N.Y., assignors, by mesne assignments, to Hooker Chemical Corporation, Niagara Falls, N.Y., a corporation of New York
Filed Nov. 25, 1964, Ser. No. 413,759
Int. Cl. C01b 7/06; B01k 1/00
U.S. Cl. 204—128    4 Claims

ABSTRACT OF THE DISCLOSURE

Hot, humid chlorine gas emanating from an electrolytic cell is cooled and dehumidified by directly contacting it with feed brine for the cell. The concomitant heat exchange from the chlorine gas mixture to the cell feed brine provides heat savings both in the chlorine liquefaction step and in any feed brine preheating step. Likewise, the water removed from wet chlorine gas by the feed brine is free from undesirable contaminants and is directly usable without further treatment in the electrolytic cell. Advantageously, a feed brine super heater may be formed as an indirect heat exchanger whereby heat from hydrogen emanating from the electrolytic cell is transferred to the cell feed brine.

---

This invention relates to the cooling, dehumidifying and drying of chlorine gas from electrolytic cells. More particularly, this invention relates to a method of cooling and dehumidifying hot chlorine gases in a manner such that the sensible heat of the chlorine gas is used to heat brine.

In the operation of an electrolytic cell for the production of chlorine, the cell temperature is preferably maintained near the boiling temperature of the electrolyte. The chlorine gas evolved is therefore hot and humid. To cool, dehumidify and subsequently liquify the chlorine requires the expenditure of large amounts of cooling liquids to remove the heat in preparation for condensation at lower temperatures.

Previous methods used for cooling hot chlorine gases involved the passing of the gasses through a condensing zone to lower the chlorine gas temperature and condense most of the water vapor. Another method used was direct contact with water wherein the chlorine gas temperature and humidity was lowered and the water discarded with or without being subjected to heating to flash off the absorbed chlorine. These methods have several disadvantages in that large quantities of cooling liquid for indirect contact or water for direct contact are required, in addition to the expenditure of additional heat to flash off chlorine absorbed in the cooling water when direct contact is used. In addition to the expenditure of large amounts of cooling liquid and heat, there resulted a disposal problem of the water contaminated with chlorine.

It is an object of the present invention to substantially reduce or eliminate these steam and heat consumption and waste disposal problems by heat recuperation of the chlorine gas. It is another object of this invention to heat brine with the sensible heat of chlorine gas evolved from electrolytic cells. A further object of this invention is to effect a lower moisture content in the chlorine gas while cooling the chlorine gas by direct contact with brine. Yet another object of this invention is to provide a process for chlorine gas cooling whereby lower operating temperatures are utilized thereby permitting the use of synthetic organic construction materials. These and other objects will become apparent to those skilled in the art from the description of the invention.

In accordance with the invention, a method is provided utilizing the sensible heat of cell gases to heat electrolyte feed solutions comprising directly contacting chlorine gases evolved from electrolytic cells with cooer feed electrolyte to effect a cooling and dehumidification of said chlorine gas and a heating of said electrolyte, and subsequently feeding the heated electrolyte to an electrolytic cell for electrolysis.

The present invention has numerous advantages over known processes, particularly in the utilization of heat which is otherwise lost to cooling water. Thus, a twofold benefit is accomplished; the amount of cooling water required is greatly reduced or eliminated and the heat requirements for heating the electrolyte prior to electrolytic decomposition is greatly reduced or eliminated. A further advantage in the present process is that lower operating temperatures are used compared to normal chlorine recovery processes which require steam for stripping chlorine from the cooling water. The present process eliminates this steam requirement and thus operates at lower temperatures. Contact coolers, often used for chlorine cooling are eliminated as well as the refrigeration units required for such processes.

The elimination of steam requirements and resulting lower operating temperatures, permit the use of inexpensive reinforced plastic equipment such as inert polyesters, epoxy resins, and the like. Further, in the heating of brine for chlor-alkali cells the water condensed from the chlorine cell gas provides ideal make-up water to dissolve salt for brine feed since it is free of undesired contaminants.

The present invention is applicable to electrolytic cells wherein heated electrolytes are used and wherein hot gases are evolved. This invention is particularly applicable to chlorine cells wherein the corrosive nature of the gaseous products do not readily lend themselves to conventional cooling and dehumidifying processes. Cells such as the chlor-alkali cells and hydrochloric acid cells are typical examples of such cells. However, this invention is not to be understood as being limited to only chlor-alkali cells and hydrochloric acid cells, in that it is applicable to all chlorine producing cells.

In that the invention will normally be used with chlor-alkali cells, the description herein will specifically describe the invention in relationship to a chlor-alkali cell, but it is to be understood that the present invention is also applicable to the above-described cells.

The invention will be described with reference to the drawing which is a partial schematic and flow sheet of the present invention.

The drawing illustrates the utilization of the sensible heat of chlor-alkali cell gases to heat brine feed solution by counter-currently directly contacting hot chlorine cell gas with cool feed brine to effect a heat exchange, re-saturating the warmed feed brine with salt, effecting an indirect heat exchange between the warmed saturated brine and hot hydrogen cell gas and subsequently feeding the heated brine to an electrolytic cell.

The use of brine as the heat exchange medium to cool chlorine gas results in an unanticipated advantage of reduced water vapor pressure in an amount of 20 to 30 percent over the cooling medium as compared with that over water. This permits chlorine dehumidification to acceptable levels at higher liquid feed temperatures. The dehumidification eliminates the requirement of expensive chilled water supply systems customarily required for direct contact coolers in addition to the elimination of a secondary cooler normally superimposed on the primary gas cooler. Where sulfuric acid is used in subsequent drying steps, the lesser amount of water in the chlorine gas reduces the consumption of sulfuric acid in these steps. An additional advantage is found in that brine will absorb only a small fraction of chlorine gas compared to water; normally, only about 20 percent of that absorbed by water is absorbed by brine. The present process preferably uses saturated brine as the cooling medium. However, the brine need not be saturated at the temperature it is fed to the direct contact heat exchanger. The feed temperature of the brine ranges from about 0 to about 40 degrees centigrade and will contain a substantial amount of salt, e.g., about 10 to 26.5 percent by weight.

In addition to the use of brine as the heat exchange medium, other salt solutions can be used as well as mixtures of salts with hydrochloric acid and hydrochloric acid solutions.

In the drawing, an electrolytic cell 10 or series of cells evolve hot chlorine gas saturated with water which gas is removed from the cell via line 12. Hot, humid hydrogen gas is also evolved and it is removed from the cell via line 14. Electrolyzed cell liquor is removed from the cell via line 16. Cell 10 is continually replenished with hot electrolyte or brine via line 18.

Hot, humid chlorine gas, at a temperature substantially equal to the cell temperature, e.g., 70 to 100 degrees centigrade, passes into heat exchanger 20 wherein a direct, counter-current heat exchange is effected with incoming brine from line 22. The incoming brine is sprayed or flooded into an open or packed column, to thereby effect a heat exchange between the hot chlorine gas and brine. The chlorine gas passes through heat exchanger 20 and mist eliminator 24 prior to exiting via line 26 to drying towers 28, 30 and 32. The drying towers are preferably used in series thereby passing the gas progressively through one or more towers. The towers are operated in the conventional manner, effecting a drying of the chlorine gas to a degree sufficient to permit handling in ferrous compressors and containers without excessive danger of corrosion.

Cool brine is continually fed to the process via line 34 wherein it is first passed through blow gas absorber 36. Alternately, a blow gas absorber need not be used and in such event the cool brine is fed directly to heat exchanger 20. Blow gas or "sniff" gas from chlorine liquifaction processes enters blow gas absorber 36 via line 38. The blow gas is the result of the bleeding off from the liquifiers, the so-called non-condensable inert gases, such as nitrogen, oxygen, hydrogen, carbon dioxide and carbon monoxide found in chlorine cell gas. The removal of the undesired inert gases results in the removal of a quantity of chlorine gas with these gases.

In blow gas absorber 36 chlorine is removed from the blow gas by absorption in brine under pressure. In that chlorine gas is considerably less soluble in brine than in water, it is preferred to effect the absorption under pressure. Therefore, blow gas absorber 36 operates under a pressure of 100 to 150 pounds or more per square inch gage pressure.

A constant level of brine is maintained in blow gas absorber 36 by level control 42. Brine, saturated with chlorine is removed from blow gas absorber 36 via line 44, passing through throttling valve 46 prior to entering heat exchanger 20 via line 22. The reduction in pressure effected on passing through throttling valve 46 causes a flashing of some of the absorbed chlorine from the brine in heat exchanger 20. A heat exchanger is then effected in heat exchanger 20 as previously described.

Salt slurry, at room temperature, is added to resaturator 48 via line 50. The salt content of the slurry is that which is sufficient to resaturate the warmed brine. Such salt content normally ranges from about 25 to 35 percent salt by weight. The amount of slurry added is regulated by throttling valve 52 which is controlled electrically by level control 54 so as to maintain a slurry level 56 within the desired range. Slurry level 56 is retained so as not to feed undissolved salt to the electrolytic cells. Brine level 58 is controlled electrically by level control 60 which controls throttling valve 62 on brine line 34. An alternate method of resaturating the brine is to operate without a bed of salt by controlling the slurry addition so that the desired degree of resaturation is effected directly. Such a method would operate using a somewhat modified type of resaturator from that shown at 48. During operation, organic impurities accumulate in the resaturator due to the removal of such impurities from the chlorine gas by direct contact with the brine. The resulting cooled chlorine is thus purified. Means are provided in the resaturator for collection and removal of the organics as they accumulate.

Brine, heated in passing through heat exchanger 20 is subsequently resaturated in resaturator 48 prior to passing into brine superheater 64 via line 66. Brine superheater 64 effects an indirect heat exchange with hot hydrogen gas evolved from cell 10. The hydrogen gas evolved from cell 10 is hot and humid. In passing the gas through superheater 64 via line 14, a considerable amount of water is condensed from the gas thereby making it more suitable for other uses. Superheater 64 is provided to increase the brine temperature so as to have the brine slightly less than saturated and thereby keep solid salt from crystallizing out in the lines feeding the cells. Instead of a superheater, a smaller bypass of heated brine from the heat exchanger 20 can be bled into the brine after resaturation, thereby providing a feed brine slightly less than saturated.

After effecting a heat exchange, cooled hydrogen gas is removed via line 68 and superheated brine is fed to cell 10 via line 18. The heat exchange in superheater 64 effects a temperature increase of 5 to 40 degrees centigrade. In addition to heating brine in superheater 64, further heating means can be used to increase the temperature of the brine prior to entering the cell if desired, but normally, such additional means are not needed. The temperature increase of the brine in superheater 64 can be regulated by providing a bypass for the liquid or hydrogen gas. Alternately, for starting up a cold circuit, live steam can be introduced into line 14.

In that the maximum temperature at which the process of the present invention operates is lower, compared to conventional contact coolers and steam stripping methods, inexpensive reinforced plastic equipment constructed of polyesters such as Hetron 72, manufactured by Hooker Chemical Corporation, and the like resins can be used, rather than the more expensive brick and rubber lined equipment customarily employed. This is a distinct advantage in that reinforced plastic equipment is more readily fabricated and is relatively maintenance free.

The invention will be readily understood with reference the following example which is illustrative of certain preferred embodiments thereof. Unless otherwise indicated, all temperatures are in degrees centigrade and all parts and percentages are by weight.

Example

In a commercial operation for the manufacture of chlorine by the electrolysis of sodium chloride in a series of deposited diaphragm type cells, chlorine gas was evolved at a rate of 100 tons per day. The chlorine gas being evolved from the series of cells was a mixture comprised of about 4.165 tons per hour of chlorine, 2.69 tons per hour of water and 6.23 pound moles per hour of non-condensable gases. This mixture, at a temperature of 90.3 degrees centigrade, entered a 54 inch column constructed of reinforced plastic and packed with Raschig rings, wherein a heat exchange was effected with brine by countercurrent, direct contact of the brine with the chlorine gas. Hot chlorine gas was passed upward in the column contacting the cool, descending brine. Exiting chlorine gas, at a temperature of about 23 degrees centigrade, was passed through a mist eliminator prior to entering a series of drying towers. This gas contained about 2.1 percent water by weight. In the drying towers the gas was substantially dried using sulfuric acid as the drying agent.

Brine, at a concentration of 25 percent sodium chloride and at a temperature of 20.5 degrees centigrade, was fed at a rate of 138 gallons per minute into the blow gas absorber. Blow gas from the chlorine liquifaction process was passed through the blow gas absorber under a pressure of 117 pounds per square inch gauge pressure. The pressurized brine, contacting the blow gas, removed substantially all the chlorine contained therein so that a substantially odorless blow gas was exhausted from the blow gas absorber at a rate of 9.45 pound moles per hour. Brine, from the blow gas absorber, was then fed to the chlorine-cooler, brine-heater wherein the pressure was reduced to atmospheric. The reduction of the brine pressure to the atmospheric in the chlorine-cooler and brine-heater effected a release of substantial amounts of the absorbed chlorine gas. This chlorine gas joined the chlorine gas stream and was recycled through the drying towers.

On passing the brine through the chlorine-cooler, brine heat exchanger, the brine temperature was increased to 70 degrees centigrade and slightly diluted by condensation thereby permitting the addition of more salt to saturate the solution. Resaturation was effected by the addition of 30 percent sodium chloride slurry to a resaturator at a rate of 12,200 pounds per hour. Heated brine, from the chlorine gas heat exchanger, was passed to the resaturator and resaturated with salt and removed from the resaturator at a temperature of 63 degrees centigrade. Resaturated brine leaving the resaturator, had a concentration of 26.5 percent sodium chloride. This brine was then passed to the brine superheater. The brine superheater effected an indirect heat exchange with a 93 degrees centigrade, humid, hydrogen gas mixture comprising 237 pounds per hour hydrogen and 7,350 pounds per hour water. During the heat exchange, 1,835 pounds per hour of water from the hydrogen stream was condensed and the remaining hydrogen exited from the superheater at a temperature of 91 degrees centigrade. The brine passing through the superheater was heated to 75 degrees centigrade and subsequently fed to the electrolytic cell series.

At the feed rate indicated, cell liquor was removed from the electrolytic cell series at a rate of 131 gallons per minute.

While there have been described various embodiments of the present invention, the apparatus and methods described are not intended to be understood as limiting the scope of the invention. It is realized that changes therein are possible, and it is further intended that each element recited in any of the following claims is to be understood as referring to all equivalent elements for accomplishing substantially the same results in substantially the same or equivalent manner. It is intended to cover the invention broadly in whatever form its principle may be utilized.

What is claimed is:

1. In a method of producing chlorine gas from brine including continuously introducing a feed brine into an electrolytic cell, heating said brine and electrolyzing said heated brine whereby hot, humid chlorine and hydrogen gases are produced, the improvement wherein said chlorine gas is cooled and dehumidified by passing the chlorine gas through and in direct contact with said feed brine whereby said brine becomes heated as it cools said chlorine gas.

2. The method of claim 1 wherein the chlorine gas is passed counter-currently to the cool brine.

3. The method of claim 1 wherein said heated brine is passed in indirect heat exchange relation to the hot hydrogen gas to further heat the brine before introduction to the cell.

4. The method of claim 3 wherein the brine is resaturated with salt prior to effecting an indirect heat exchange with hot hydrogen gas.

References Cited

UNITED STATES PATENTS

| | | | |
|---|---|---|---|
| 1,023,545 | 4/1912 | Bates et al. | 204—95 |
| 2,447,834 | 8/1948 | Balcar | 23—219 |
| 2,628,935 | 2/1953 | Earnest et al. | 204—95 |
| 2,822,898 | 2/1958 | Sutter | 23—219 XR |
| 2,846,422 | 8/1958 | Green | 165—107 XR |
| 3,031,769 | 5/1962 | Wilson | 165—107 XR |
| 3,052,612 | 9/1962 | Henegar et al. | 204—128 |
| 3,249,152 | 5/1966 | Buss et al. | 165—1 |

JOHN H. MACK, *Primary Examiner.*

D. R. JORDAN, *Assistant Examiner.*

U.S. Cl. X.R.

204—241, 278